US008798816B1

(12) United States Patent
Guyot

(10) Patent No.: US 8,798,816 B1
(45) Date of Patent: Aug. 5, 2014

(54) METHOD AND SYSTEM FOR UNLOADING THE INERTIA WHEELS OF A SPACECRAFT

(75) Inventor: Francois Guyot, Saint-Geoire-en-Valdaine (FR)

(73) Assignee: Thales, Neuilly sur Seine (FR)

( * ) Notice: Subject to any disclaimer, the term of this patent is extended or adjusted under 35 U.S.C. 154(b) by 1127 days.

(21) Appl. No.: 12/574,902

(22) Filed: Oct. 7, 2009

(30) Foreign Application Priority Data

Oct. 31, 2008 (FR) .................... 08 06076

(51) Int. Cl.
*B64G 1/24* (2006.01)
(52) U.S. Cl.
USPC .............. 701/13; 244/164; 244/165; 244/171
(58) Field of Classification Search
USPC ......... 244/164, 165, 169, 171, 172.7; 701/13, 701/531
See application file for complete search history.

(56) References Cited

U.S. PATENT DOCUMENTS

| 4,010,921 | A | * | 3/1977 | Pistiner et al. ................ 244/166 |
| 5,312,073 | A | | 5/1994 | Flament et al. |
| 5,354,016 | A | | 10/1994 | Goodzeit et al. |
| 6,382,565 | B1 | * | 5/2002 | Fowell ........................ 244/165 |
| 6,523,785 | B1 | | 2/2003 | Hennigan |

FOREIGN PATENT DOCUMENTS

| EP | 0 568 209 A1 | 11/1993 |
| EP | 0 937 644 A2 | 8/1999 |
| EP | 937644 A2 * | 8/1999 |
| JP | 10-167197 A | 6/1998 |

* cited by examiner

*Primary Examiner* — Adam Tissot
(74) *Attorney, Agent, or Firm* — Baker & Hostetler LLP

(57) ABSTRACT

The method for unloading the inertia wheels of a spacecraft comprising three references axes X, Y, Z, the axis Z corresponding to a pointing direction, consists in inverting the direction of accumulation of the angular momentum in the wheels by automatic rotational flipping of the spacecraft about the axis Z, the pointing direction remaining fixed. The method has application to the field of satellites or of interplanetary probes.

9 Claims, 6 Drawing Sheets

METHOD AND SYSTEM FOR UNLOADING THE INERTIA WHEELS OF A SPACECRAFT

CROSS-REFERENCE TO RELATED APPLICATIONS

This application claims priority of French application no. FR 0806076, filed Oct. 31, 2008, the disclosure of which is hereby incorporated by reference in its entirety.

FIELD OF THE INVENTION

The present invention relates to a method and a system for unloading the inertia wheels of a spacecraft. It applies notably to the field of satellites or of interplanetary probes that have to maintain, irrespective of their trajectory or of their orbit, a very precise orientation, called attitude, in order to ensure, according to their mission, the correct orientation of their antennae, of their solar panels, and of the scientific instruments placed on board.

BACKGROUND OF THE INVENTION

The attitude, that is to say the angular orientation, of a spacecraft such as a satellite or a probe on a predetermined trajectory is usually controlled by internal actuators such as inertia wheels making it possible to apply an internal torque to the spacecraft and to cause a rotation about one of its axes X, Y, Z, the axes X, Y, Z forming a reference trihedron associated with the spacecraft. The spacecraft tends to become misaligned under the action of the disruptive torques produced by the environment such as the solar pressure, aerodynamic friction forces, electromagnetic torques, and torques due to the gravity gradient. It is therefore necessary to actively control the angular orientation of the spacecraft and ensure stability of this orientation on its three axes. The attitude is permanently controlled by a feedback loop comprising sensors which measure the orientation of the spacecraft, an onboard computer which processes these measurements and establishes the commands that are executed by one or more actuators in order to counterbalance the drifts and maintain an orientation in a chosen direction. However, every time the wheels supply an internal torque, their speed increases up to a maximum speed called saturation speed. When the maximum speed is reached, the inertia wheels can no longer compensate for the drifts and the onboard computer then begins a wheel-unloading operation.

The wheels are usually unloaded by using additional external actuators applying to the spacecraft an external torque that is chosen so as to reduce the speed of the wheels until the wheels resume their original speed.

To unload the inertia wheels, it is known practice to use magneto torquer bars which, by interaction with the terrestrial magnetic field, create a magnetic torque in order to reduce the speed of the wheels. These external actuators work well for spacecraft placed in low earth orbit, LEO, about a planet with a magnetosphere such as the Earth, for altitudes usually of up to 2000 km for the Earth, because the intensity of the terrestrial magnetic field is high close to the planet but they work less well on average at higher altitudes. In addition, in equatorial earth orbit, the plane of the orbit is that of the terrestrial equator and the axis of the magnetic field is virtually orthogonal to the plane of the orbit. Since no magnetic torque can be created on the axis of the magnetic field, certain drifts of the satellite can therefore not be compensated for by these actuators.

At high altitude or in geostationary orbit GEO (Geosynchronous Earth Orbit), it is known practice to use thrusters to carry out the unloading of the inertia wheels. The thrusters make it possible to create an external torque by the emission of gas jets. However, the thrusters have the disadvantage of moving the spacecraft in rotation but also in translation which disrupts the orbit of the spacecraft, creates many vibrations and causes pointing losses. In addition, since the thrusters are usually placed on one of the sides of the spacecraft, it is necessary to have the spacecraft turn in rotation in order to correctly orient the thrusters during the operation for unloading the inertia wheels. Finally, the use of the thrusters to unload the wheels causes additional fuel consumption while the inertia wheels are powered electrically via the solar energy captured by solar panels with which the spacecraft is fitted.

SUMMARY OF THE INVENTION

The object of the present invention is to remedy these problems by proposing a new method for unloading the inertia wheels of a spacecraft, in which the unloading is carried out automatically, does not require additional external actuators, makes it possible to save the reserves of fuel and therefore makes it possible to simplify and thus reduce the weight and cost of the spacecraft.

Accordingly, the subject of the invention is a method for unloading the inertia wheels of a spacecraft, the spacecraft comprising three reference axes X, Y, Z, the axis Z corresponding to a pointing direction and the spacecraft having a capacity to accumulate an onboard angular momentum in the wheels up to a maximum loading value corresponding to a maximum angular speed, consisting, for unloading the spacecraft along the three axes X, Y, Z, in inverting the direction of accumulation of the angular momentum in the wheels by automatic flipping of the spacecraft about the axis Z, the pointing direction remaining fixed.

Advantageously, the method consists:
in choosing a threshold value Hs for triggering the unloading of the wheels and a reference onboard angular momentum vector $\vec{H}_0$,
in periodically measuring the angular speed of each inertia wheel,
for each speed measurement, in calculating an onboard angular momentum vector and deducing therefrom an accumulated angular momentum $H_i$ equal to a difference, in modulus, between the onboard angular momentum vector $\vec{H}_i$ and the reference onboard angular momentum vector $\vec{H}_0$,
in comparing the accumulated angular momentum $H_i$ with the threshold value Hs,
when the accumulated angular momentum $H_i$ is greater than the threshold value Hs, in taking a decision (10) on the triggering of a flipping manoeuvre making it possible to unload the wheels, then in triggering an automatic manoeuvre (30) for rotational flipping of the spacecraft by a predetermined angle about the axis Z, the pointing direction remaining fixed.

Optionally, the decision on triggering the flipping manoeuvre allowing the wheels to be unloaded is taken if $H_i$ increases between two successive measurements.

Advantageously, the threshold value Hs is less than the maximum loading value.

Preferably, the rotational flipping angle is equal to 180°.

Preferably, the triggering of the rotational flipping manoeuvre is authorized when the spacecraft is in a predetermined position on its trajectory. For example, the predetermined position may correspond to the spacecraft passing over a geographic zone of the earth of low population density, or to the spacecraft passing into a zone where it is night.

Advantageously, the manoeuvre for rotational flipping of the spacecraft is carried out by at least one inertia wheel.

The invention also relates to a system for unloading the inertia wheels of a spacecraft comprising at least one inertia wheel, the spacecraft having a capacity to accumulate an onboard angular momentum in a wheel up to a maximum loading value, said system comprising means for triggering an automatic manoeuvre for rotational flipping of the spacecraft by a predetermined angle about an axis Z corresponding to a pointing direction, the pointing direction remaining fixed, the angle being chosen so as to invert the direction of accumulation of the angular momentum in the wheels.

Advantageously, the system also comprises at least one speed sensor mounted on the inertia wheel, means for computing the angular momentum $H_i$ accumulated by the inertia wheel corresponding to the measured speed, means for comparing the angular momentum of the wheel with a previously chosen threshold value for triggering the unloading of the wheels, means for deciding on triggering a flipping manoeuvre of the spacecraft when the value of the angular momentum of the wheel is greater than the threshold value.

Finally, the invention also relates to a spacecraft comprising at least one inertia wheel and one axis Z corresponding to a pointing direction and a system for unloading the inertia wheel.

BRIEF DESCRIPTION OF THE DRAWINGS

Other particular features and advantages of the invention will clearly appear in the rest of the description given as a purely illustrative and non-limiting example, with reference to the appended schematic drawings which represent.

DETAILED DESCRIPTION

Figure 1:
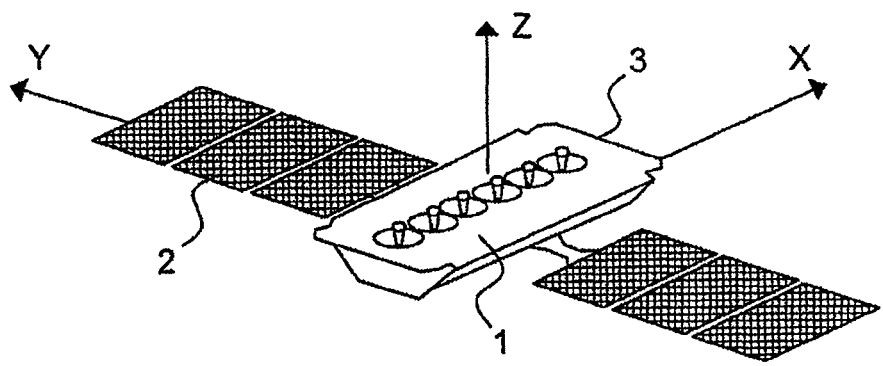
FIG. 1: a diagram in perspective of an example of a spacecraft, according to the invention.
Figure 2:
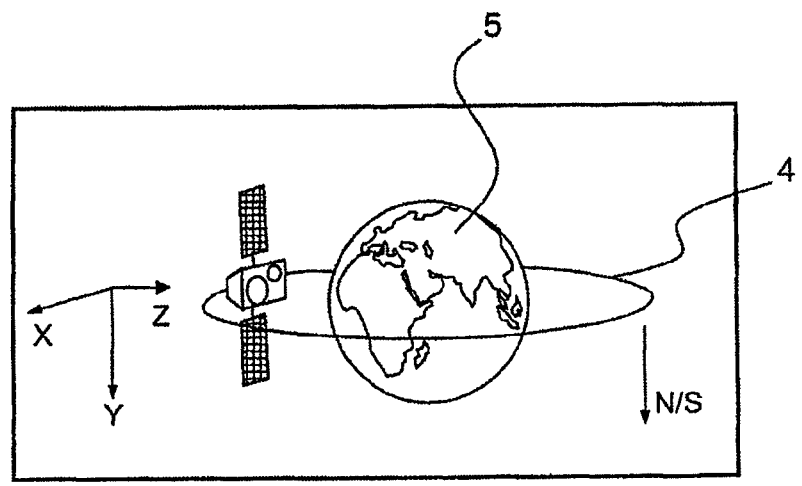
FIG. 2: a schematic view in perspective of an example of a spacecraft placed in an equatorial orbit about a planet, according to the invention.
Figure 3:
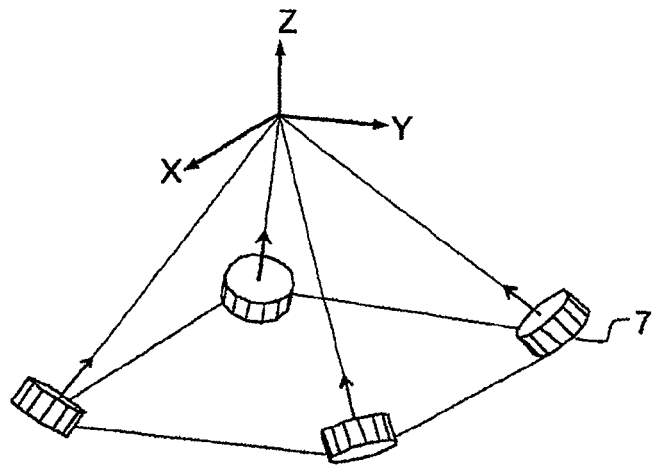
FIG. 3: a diagram of an exemplary arrangement of the inertia wheels in a spacecraft.

FIG. 1 represents an example of a spacecraft, for example a telecommunications satellite, comprising a platform 1 fitted with solar panels 2 and a payload comprising transmit and receive antennae 3. The spacecraft comprises three axes X, Y, Z forming a reference coordinate system associated with the spacecraft. In FIG. 1, the axis X may correspond to a direction of flight on a predetermined trajectory such as, for example, an orbit about the Earth as shown for example in FIG. 2, the axis Y is oriented north/south, the yaw axis Z is orthogonal to the plane formed by the axes X and Y and corresponds to a pointing direction. The solar panels 2 are oriented in the direction of the axis Y and the antennae 3 are oriented along the yaw axis Z, for example towards the earth or towards a star. The spacecraft comprises at least three inertia wheels 4, also called reaction wheels, as shown for example in FIG. 3. The inertia wheels are usually incorporated into the body of the satellite, for example into the platform 1. To generate a reaction torque along the three axes X, Y, Z, and make it possible to stabilize the angular orientation of the spacecraft, three wheels are necessary. The addition of a fourth wheel is a redundancy that is useful in the case of failure of one of the wheels or in order to prevent the wheels reaching a zero speed which may sometimes cause disruptions to the pointing of the satellite. During the manoeuvres carried out to correct a drift in the attitude of the spacecraft, the wheels 4 supply an internal torque which can increase their speed of rotation and therefore their accumulated angular momentum.

Moreover, a rotational manoeuvre of the satellite with the wheels temporarily causes the wheels to increase speed between the beginning and the end of the manoeuvre. To turn the satellite, the wheels are loaded with angular momentum which, according to the law of conserving angular momentum, is transferred to the body of the satellite.

Figure 4A:
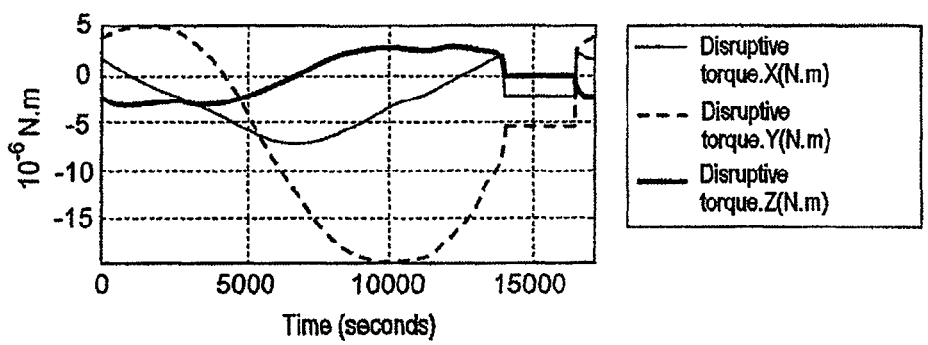
FIGS. 4a and 4b: an example of the trend as a function of time of the disruptive torques along the axes X, Y, Z, and of their impact on the angular momentum accumulated by the inertia wheels during an orbital period.
Figure 4B:
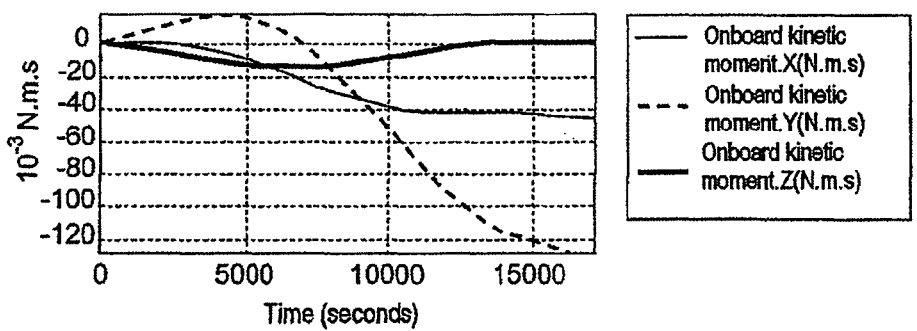

FIGS. 4a and 4b show respectively an example of the trend as a function of time of the disruptive torques along the axes X, Y, Z and of their impact on the angular momentum accumulated by the inertia wheels 4 during an orbital period. In this example, the spacecraft is a satellite placed in a terrestrial equatorial orbit at medium altitude, between 2000 km and 36 000 km. At these altitudes, the main disruptive torques that act on the attitude of the spacecraft are the torques due to the solar pressure and the torques due to the gravity gradient. For example, at an altitude of 8 000 km, the torques due to atmospheric friction are negligible.

Moreover, the residual magnetic torque has no impact on the angular momentum accumulated by the inertia wheels because it self-compensates on average over time. These figures show that, because of the solar pressure, the disruptions change all along the orbit depending on the orientation of the satellite relative to the sun and that the components of the onboard angular momentum along the axes X, Y, Z have increased after one orbit. Moreover, when the Earth eclipses the Sun relative to the satellite, that is between 14 000 seconds and 16 000 seconds on the curves shown, there is no more solar pressure and the disruptive torques mainly due to the gravity gradient are more or less constant. The changes of direction of trend of the onboard angular momentum are due to an exchange of angular momentum between the axes of the satellite because of its rotation about the axis Y (north/south). This rotation is associated with the pointing of the satellite in the direction of the Earth.

Figure 5A:
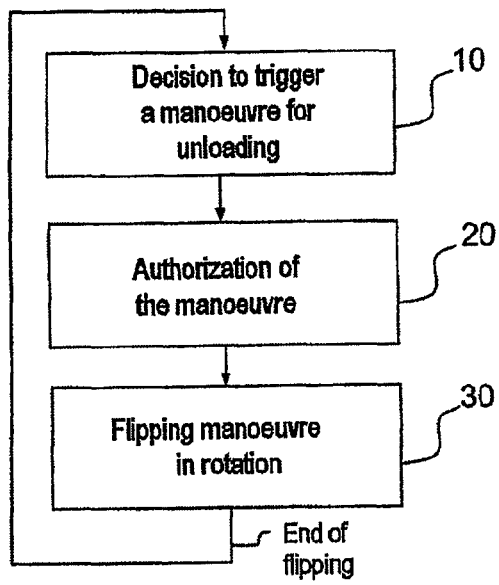
FIGS. 5a and 5b: two block diagrams showing the main steps of the method for unloading the inertia wheels of a spacecraft, according to the invention.
Figure 5B:
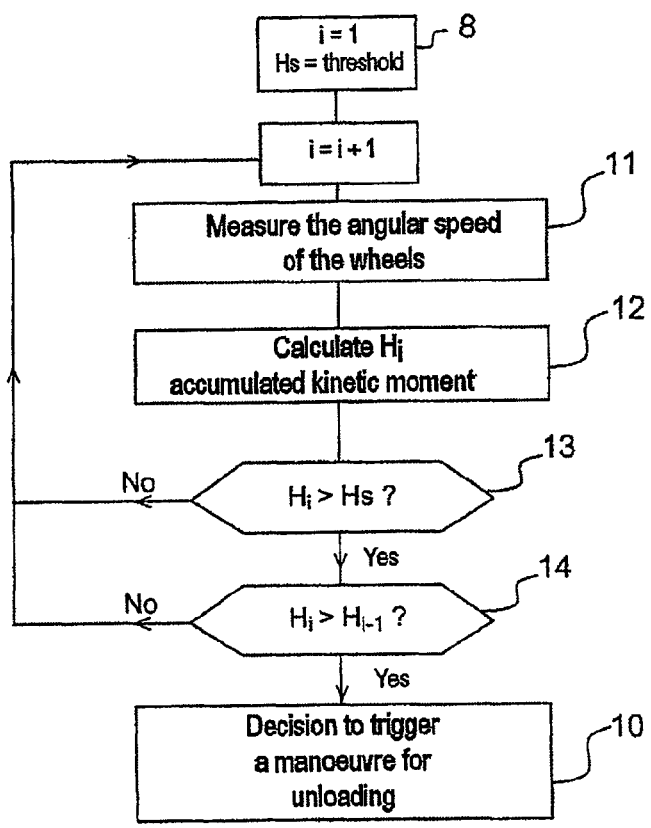

FIGS. 5a and 5b represent two block diagrams showing the main steps of the method for unloading the inertia wheels 4 of a spacecraft, according to the invention. In order to make the invention easier to understand, the method is described by taking the example of a spacecraft in orbit abut a planet such as the Earth and having its antennae pointed in a pointing direction corresponding to the yaw axis Z.

The first step 10, consists in taking a decision on the triggering of a manoeuvre in order to unload the inertia wheels based on measurements 11 of the angular speeds of each inertia wheel, the measurements being taken periodically. During this step, the yaw axis Z is kept fixed. During a first iteration i=1, in a preliminary step 8, a threshold value Hs for triggering the unloading of the wheels and a reference onboard angular momentum vector $\vec{H}_0$ are chosen. $\vec{H}_0$ is a 3-dimensional vector and forms a desired value for the onboard angular momentum. Depending on the application in question, the vector $\vec{H}_0$ may be zero or not zero.

When the spacecraft is a satellite in orbit about a planet, the speed measurements can be taken for example on each orbit.

In this case, on each orbit, speed sensors placed on each inertia wheel measure the angular speed $\Omega$ of the wheels. The angular speeds $\Omega$ measured are transmitted to an onboard computer which, based on the speed measurements $\Omega$, on each iteration i, computes the onboard angular momentum vector and deduces therefrom the accumulated angular momentum $H_i$ equal to the difference, in modulus, between the onboard angular momentum vector $\vec{H}_i$ and the reference vector $\vec{H}_0$. The accumulated angular momentum $H_i$ is obtained preferably—for the unloading indicated along the three axes of the satellite—by computing the norm of order two of the difference between the onboard angular momentum vector $\vec{H}_i$ and the reference vector $\vec{H}_0$ or—for a partial unloading along a single axis with unit vector $\vec{u}$—by calculating the scalar product of the difference between the onboard angular momentum vector $\vec{H}_i$ and the reference vector $\vec{H}_0$ with the unit vector: $(\vec{H}_i - \vec{H}_0) \cdot \vec{u}$. For example, for an unloading of the axis Y with a zero reference vector $\vec{H}_0$, the accumulated angular momentum $H_i$ is equal to the component $Hy_{,i}$ along the axis Y, of the onboard angular momentum vector $\vec{H}_i$.

The reference angular momentum vector $\vec{H}_0$ is a parameter, a 3-dimensional vector. The 3-dimensional onboard angular momentum vector $\vec{H}_i$ is computed by a vector sum of the angular momenta of the wheels. The angular momentum of each wheel is obtained by multiplying the angular speed of the wheel by the rotational inertia of the wheel. The inertia I of each wheel is an intrinsic characteristic of the wheel. If all the wheels are identical, they have the same inertia. The speed vector is an n-dimensional vector, n being the number of wheels.

The decision to trigger the manoeuvre to unload the wheels is then taken by the onboard computer according to the following process. The value $H_i$ of accumulated angular momentum on at least one axis is compared with the threshold value Hs for triggering the unloading. The test 13 is then carried out to determine whether the value $H_i$ is greater than the threshold value Hs. Optionally, a second test 14 may also be carried out to determine whether the accumulated angular momentum $H_i$ is increasing $H_i > H_{i-1}$. If the test 13, and if appropriate the test 14, is positive, then the decision to trigger the flipping manoeuvre allowing the unloading of the wheels is taken. If the test 13, or if appropriate the test 14, is negative, the method is incremented for the next iteration with a new angular speed measurement of the inertia wheels. The threshold value Hs is a value that is predetermined according to the range of variation of onboard angular momentum that is allowed. The choice of the threshold value depends on the maximum capacity in angular momentum of the inertia wheels, on the orientation of the wheels in the spacecraft, on the desired average onboard angular momentum on the satellite, on the angular momentum margins for example allocated to the manoeuvres and to the attitude control of the spacecraft, and results from a compromise consisting in not triggering the unloading too frequently but in triggering it sufficiently early so that the wheels do not reach the saturation value.

The second step 20 is optional. It consists in authorizing the triggering of the manoeuvre to unload the wheels when the position of the spacecraft in its orbit reaches an authorized range of manoeuvre. According to the invention, the manoeuvre for unloading the wheels consists in causing a yaw flip of the spacecraft by a predetermined angle about the yaw axis Z, the yaw axis Z remaining fixed.

Figure 6A:
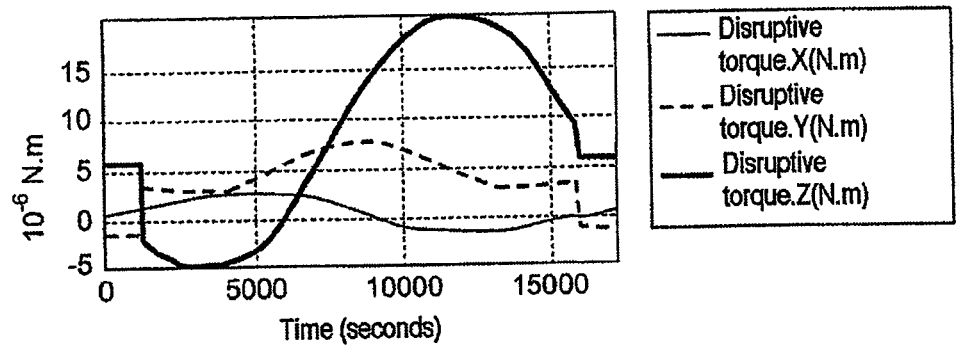
FIGS. 6a and 6b: an example of the trend as a function of time of the disruptive torques along the axes X, Y, Z, before and after the rotational flipping of the spacecraft, according to the invention.
Figure 6B:
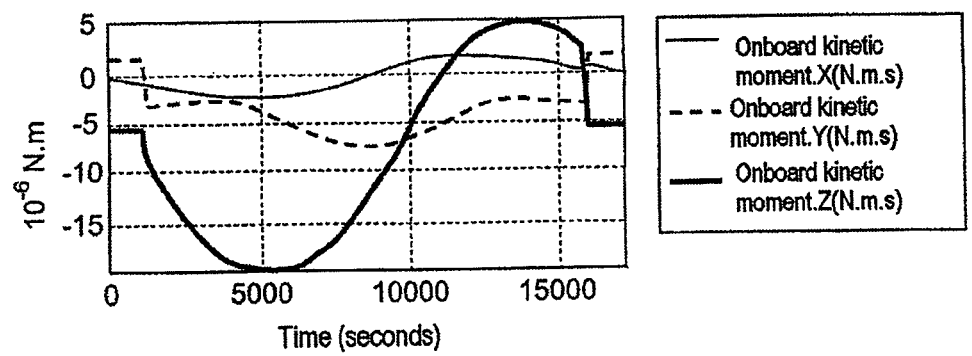
Figure 7A:
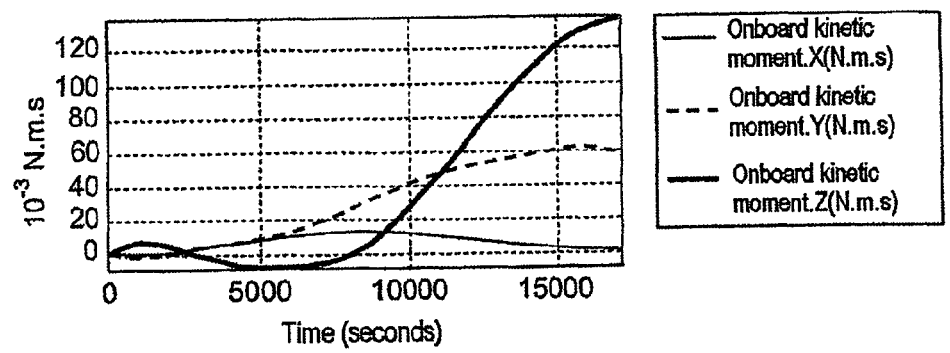
FIGS. 7a and 7b: an example of the trend of the angular momentum accumulated by the wheels before and after the rotational flipping of the spacecraft, according to the invention.
Figure 7B:
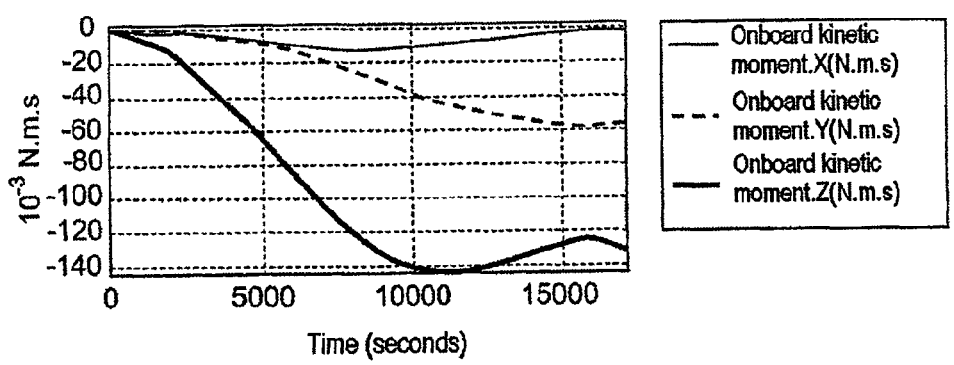

This rotation about the axis Z, or about an axis close to Z, makes it possible to unload the wheels in the three directions of space. In particular, the rotation about the axis Z makes it possible to completely solve the initial problem of unloading the axis Y corresponding to the direction north/south, parallel to the terrestrial magnetic field. There may however remain a residual angular momentum which may potentially increase over time. Advantageously, in order to eliminate this residual angular momentum, the system for unloading the wheels according to the invention may be supplemented by an additional unloading system, for example a magnetic unloading system. When the spacecraft is in orbit about a planet, the angle of rotational flip is preferably equal, or approximately equal, to 180°, which corresponds to an inverting of the spacecraft, so that the torques exerted by the stray fields on the spacecraft before and after the rotational flip are in opposite directions and their effects are balanced progressively as shown in FIGS. 6a and 6b. This rotational flip therefore makes it possible to reduce the angular speed of the inertia wheels until they return to their initial value and the angular momentum accumulated, on the spacecraft, by the wheels before the rotational flip of the spacecraft is progressively compensated for after the rotational flip as shown in FIGS. 7a and 7b. FIG. 7a, respectively 7b, shows the angular momentum accumulation by the wheels on the 3 axes of the satellite during an orbital period, this accumulation being due to the disruptive torques represented in FIG. 6a, respectively 6b, before, respectively after, a flip of 180° about the axis Z of the satellite. At 16 000 seconds, corresponding to an orbital period, the components of the onboard angular momentum of FIG. 7a are opposite and equal in modulus to those of FIG. 7b.

However, during the rotation of the spacecraft, there is a risk of the antennae becoming misaligned and of adversely affecting the data transmission bit rate. When the spacecraft is a satellite in earth orbit, such as for example a telecommunications satellite, the degradation of the data transmission bit rate may have serious consequences. In order to limit the consequences, advantageously, the rotational flip of the spacecraft is authorized when the position of the spacecraft in its orbit is located above a geographic zone that is sparsely inhabited or during the night when the communication bit rate requirement is reduced. The yaw axis Z of the spacecraft is then held fixed, the spacecraft continuing to travel on its orbit until it passes over an authorized range of manoeuvre. When the spacecraft reaches the authorized range, the computer commands the rotational flip of the spacecraft.

The third step 30 relates to carrying out the rotational flipping manoeuvre. The yaw axis Z of the spacecraft remains fixed and pointed toward the earth while the spacecraft turns about the yaw axis Z, or about an axis close to the yaw axis, by a predetermined angle, preferably equal to 180°, or close to 180°, until the manoeuvre is completed. The rotational flipping manoeuvre is advantageously carried out by the inertia wheels and does not require additional actuators. During the rotational flipping manoeuvre, the onboard angular momentum in the wheels varies due to the change in the speeds of the wheels, but the total angular momentum of the assembly formed by the satellite and the wheels remains constant in an inertial coordinate system and there is only one exchange of angular momentum between the wheels. The onboard angular momentum in the wheels expressed in an inertial coordinate system is more or less identical before and after the flipping manoeuvre.

When the rotational flipping manoeuvre is complete, the method according to the invention consists in returning to step 10 in order to repeat a new cycle of monitoring the angular speed of the inertia wheels of the spacecraft and of unloading manoeuvres if necessary. The automatic flipping over of the satellite during each unloading manoeuvre allows the disruptive external torques, such as the solar pressure and the gravity gradient, to change the average speed of the inertia wheels in a first direction and then in a second direction opposite to the first direction and thereby to allow the speed of the inertia wheels to remain below the saturation threshold.

Figure 8A:
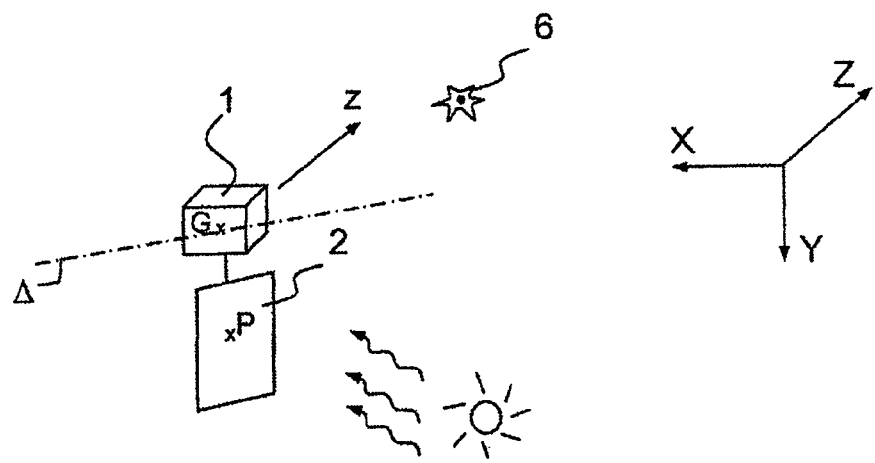
FIGS. 8a and 8b: a second example of application of the method according to the invention to the unloading of the wheels of a spacecraft in space.
Figure 8B:
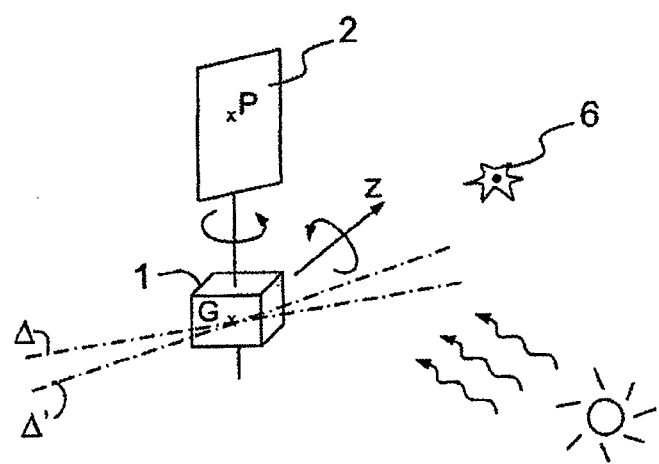

FIGS. 8*a* and 8*b* show a second example of application of the method for unloading the wheels of a spacecraft located in any location in space, for example a satellite in inertial pointing mode. The satellite may, for example, point towards a star from a zone in space situated at the Lagrange point L2. The satellite has a centre of gravity G and a point P corresponding to the centre of thrust of the solar pressure and comprises a platform 1 and a solar panel 2. The longitudinal axis of the solar panel is for example the axis Y, the pointing axis is the axis Z, the axis X being orthogonal to the plane YZ. Since the satellite subjected to solar pressure has only one solar panel and a solar thrust centre that is offset relative to the centre of gravity, it is off-balance and accumulates a considerable angular momentum in the wheels on an axis Δ corresponding to the axis of the solar torque. To unload the wheels, the method according to the invention consists in flipping the satellite about the pointing axis Z and inverting the direction of accumulation of the angular momentum in the wheels. The flipping angle is preferably equal to 180°. After flipping, the angular momentum accumulates on an axis Δ' which is usually slightly different from the axis Δ because of the shift in the centre of solar thrust relative to the centre of gravity of the satellite. When the axis Δ is identical to the axis Δ', there is complete unloading on the three axes X, Y, Z. If there is a difference between the two axes Δ and Δ' as shown in FIG. 8*b*, the unloading is not complete on the three axes X, Y, Z and a residual angular momentum remains in the plane formed by the axes Δ and Δ', mainly on the axis Y in this example. In this case, although this residual angular momentum is small compared with the accumulation on the mean axis, bisecting Δ and Δ', it is preferable to add an additional unloading system, for example of the thruster type.

Although the invention has been described with reference to a particular embodiment, it is clear that it is in no way limited thereto and that it includes all the technical equivalents of the means described and their combinations if they are included in the context of the invention.

What is claimed is:

1. A method for unloading inertia wheels of a spacecraft, the spacecraft comprising three reference axes X, Y, Z, the Z axis corresponding to a pointing direction and the spacecraft having a capacity to accumulate an onboard angular momentum in the inertia wheels up to a maximum loading value corresponding to a maximum angular speed, said method comprising, for unloading the inertia wheels of the spacecraft along the three axes X, Y, Z comprising:

choosing a threshold value Hs for the onboard angular momentum in the inertia wheels, said threshold value being less than the maximum loading value, and, flipping the spacecraft only about the Z axis, while a pointing direction remains fixed, when the onboard angular momentum in the inertia wheels reaches or exceeds said threshold value, the flipping inverting the direction of accumulation of the angular momentum in the inertia wheels.

2. The method according to claim 1, further comprising:

choosing a reference onboard angular momentum vector $\vec{H}_0$, periodically measuring the angular speed of each inertia wheel, for each speed measurement, calculating an onboard angular momentum vector $\vec{H}_i$ and deducing therefrom an accumulated angular momentum Hi equal to a difference, in modulus, between the onboard angular momentum vector $\vec{H}_i$ and the reference onboard angular momentum vector $\vec{H}_0$, comparing the accumulated angular momentum Hi with the threshold value Hs, when the accumulated angular momentum Hi is greater than the threshold value Hs, taking a decision on the triggering of a flipping manoeuvre making it possible to unload the wheels, then triggering an automatic manoeuvre for rotational flipping of the spacecraft by a predetermined angle about the axis Z, the pointing direction remaining fixed, wherein the rotational flipping manoeuvre of the spacecraft is carried out by at least one inertia wheel.

3. The method according to claim 2, wherein the decision on triggering the flipping manoeuvre is taken if $H_i$ increases between two successive measurements.

4. The method according to claim 1, comprising flipping the spacecraft by an angle equal to 180° about the axis Z.

5. The method according to claim 2, wherein the triggering of the rotational flipping manoeuvre is authorized in a prior step of authorizing the flipping manoeuvre allowing the unloading when the spacecraft is in a predetermined position on a trajectory.

6. The method according to claim 5, wherein the predetermined position corresponds to the spacecraft passing over a geographic land zone of low population density or when the spacecraft passes into a zone where it is night.

7. A system for a spacecraft comprising at least one inertia wheel, the spacecraft having a capacity to accumulate an onboard angular momentum in the at least one inertia wheel up to a maximum loading value, said system for unloading the at least one inertia wheel, said system comprising:

at least one onboard computer for storing a threshold value Hs for the onboard angular momentum in the at least one inertia wheel, said threshold value being less than a maximum loading value, and, the at least one onboard computer triggering an automatic manoeuvre for rotational flipping of the spacecraft by a predetermined angle only about a Z axis corresponding to a pointing direction, the pointing direction remaining fixed, when the onboard angular momentum in the at least one wheel reaches or exceeds said threshold value, the angle being chosen so as to invert the direction of accumulation of the angular momentum in the at least one inertia wheel.

8. The unloading system according to claim 7, further comprising at least one speed sensor mounted on the inertia wheel, the at least one onboard computer computing the angular momentum $H_i$ accumulated by the inertia wheel corresponding to the measured speed, the at least one onboard computer comparing the angular momentum accumulated by the wheel with a previously chosen threshold value Hs for triggering the unloading of the wheels, and the at least one onboard computer deciding on triggering a flipping manoeuvre of the spacecraft when the value of the angular momentum accumulated by the wheel is greater than the threshold value.

9. A spacecraft comprising at least one inertia wheel and one axis Z corresponding to a pointing direction and comprising a system for unloading the inertia wheel according to claim 7.

\* \* \* \* \*